(12) United States Patent
Lin et al.

(10) Patent No.: US 12,487,188 B2
(45) Date of Patent: Dec. 2, 2025

(54) WAFER DEFECT ANALYZING DEVICE AND WAFER DEFECT ANALYZING METHOD

(71) Applicant: INGENTEC CORPORATION, Miaoli County (TW)

(72) Inventors: Chia-Liang Lin, Miaoli County (TW); Ai-Sen Liu, Miaoli County (TW); Cheng-Yu Chung, Miaoli County (TW); Hsiang-An Feng, Miaoli County (TW); Ya-Li Chen, Miaoli County (TW)

(73) Assignee: INGENTEC CORPORATION, Miaoli County (TW)

( * ) Notice: Subject to any disclaimer, the term of this patent is extended or adjusted under 35 U.S.C. 154(b) by 71 days.

(21) Appl. No.: 18/744,727

(22) Filed: Jun. 17, 2024

(65) Prior Publication Data

US 2025/0189460 A1  Jun. 12, 2025

(30) Foreign Application Priority Data

Dec. 6, 2023 (TW) ................................. 112147344

(51) Int. Cl.
*G01N 21/95* (2006.01)
*G01N 21/88* (2006.01)

(52) U.S. Cl.
CPC ..... *G01N 21/9501* (2013.01); *G01N 21/8806* (2013.01); *G01N 21/8851* (2013.01);
(Continued)

(58) Field of Classification Search
CPC .......... G01N 21/9501; G01N 21/8806; G01N 21/8851; G01N 2021/8887;
(Continued)

(56) References Cited

U.S. PATENT DOCUMENTS

| | | | |
|---|---|---|---|
| 2002/0051566 A1 | 5/2002 | Yamashita | |
| 2008/0144023 A1* | 6/2008 | Shibata | G01N 21/4788 356/237.2 |
| 2016/0261786 A1* | 9/2016 | Ahn | H04N 23/56 |

FOREIGN PATENT DOCUMENTS

| | | |
|---|---|---|
| TW | 201024714 A | 7/2010 |
| TW | 201447285 A | 12/2014 |

(Continued)

*Primary Examiner* — Seung C Sohn
(74) *Attorney, Agent, or Firm* — CKC & Partners Co., LLC

(57) ABSTRACT

A wafer defect analyzing device includes a light source, an imaging mechanism, a height adjusting mechanism and a processor. The light source is configured to carry a wafer and to emit an infrared light. The imaging mechanism includes a camera facing toward the light source for shooting the wafer, a microscopic objective lens located between the camera and the light source, a light filtering element located between the camera and the microscopic objective lens, and a gain element located between the camera and the light filtering element. The height adjusting mechanism is connected to the imaging mechanism and includes a motor. The processor is signally connected to the imaging mechanism. The height adjusting mechanism moves the imaging mechanism along a longitudinal axis, the imaging mechanism shoots a plurality of images of the wafer, and the processor receives and analyzes the images to analyze a defect on the wafer.

15 Claims, 3 Drawing Sheets

(52) U.S. Cl.
CPC ............... *G01N 2021/8887* (2013.01); *G01N 2201/025* (2013.01); *G01N 2201/0638* (2013.01); *G01N 2201/068* (2013.01)

(58) Field of Classification Search
CPC ..... G01N 2201/025; G01N 2201/0638; G01N 2201/068; G01N 21/9505; G01N 21/01; G01B 11/22; H01L 22/12
See application file for complete search history.

(56) References Cited

FOREIGN PATENT DOCUMENTS

| | | |
|---|---|---|
| TW | 201913084 A | 4/2019 |
| TW | 202106399 A | 2/2021 |

\* cited by examiner

WAFER DEFECT ANALYZING DEVICE AND WAFER DEFECT ANALYZING METHOD

RELATED APPLICATIONS

This application claims priority to Taiwan Application Serial Number 112147344, filed Dec. 6, 2023, which is herein incorporated by reference.

BACKGROUND

Technical Field

The present disclosure relates to a defect analyzing device and a defect analyzing method. More particularly, the present disclosure relates to a wafer defect analyzing device and a wafer defect analyzing method.

Description of Related Art

With the improvement of the technique, silicon wafers are widely used in the semiconductor industry and the optic industry. As manufacturing the silicon wafer, subsurface defects are easily generated, which may cause problems in the stability and reliability of the semiconductor in the later process. Hence, how to detect the subsurface defects of the wafer becomes very important.

A conventional subsurface defect detecting method includes a laser source and a detector. The laser source emits a laser light to a subsurface of the wafer with a specific angle, and as the laser light passes defects, scattered light generated therefrom may be received by the detector. However, energy of the scattered light is too small to be detected, and improvement thereof is required. Although there are other subsurface defect detecting methods, the subsurface defect detecting methods include their own detecting limits. For example, some of the methods require transparent samples, and some of the methods have high requirements in surface roughness of samples. Moreover, the depth of the defect cannot be accurately measured.

Based on the above, how to improve structures of devices for detecting the subsurface defects of the wafer to increase defect detecting ability thereof becomes a target that those in the fields peruse.

SUMMARY

According to one aspect of the present disclosure, a wafer defect analyzing device includes a light source, an imaging mechanism, a height adjusting mechanism and a processor. The light source is configured to carry a wafer and to emit an infrared light. The imaging mechanism includes a camera facing toward the light source for shooting the wafer, a microscopic objective lens located between the camera and the light source, a light filtering element located between the camera and the microscopic objective lens, and a gain element located between the camera and the light filtering element. The height adjusting mechanism is connected to the imaging mechanism and includes a motor. The processor is signally connected to the imaging mechanism. The height adjusting mechanism moves the imaging mechanism along a longitudinal axis, the imaging mechanism shoots a plurality of images of the wafer, and the processor receives and analyzes the images to analyze a defect on the wafer.

According to another aspect of the present disclosure, a wafer defect analyzing method includes an illustrating step and a defect depth analyzing step. In the illustrating step, a wafer is placed above a light source, and the light source emits an infrared light penetrating the wafer. In the defect depth analyzing step, a motor of a height adjusting mechanism drives an imaging mechanism to move toward the wafer along a longitudinal axis to allow the imaging mechanism to shoot a plurality of images respectively corresponding to a plurality of focal positions in a shot area of the wafer, the imaging mechanism includes a camera, a gain element, a light filtering element and a microscopic objective lens arranged in order along the longitudinal axis, and a processor confirms a depth of a defect in the shot area according to the images and the focal positions.

BRIEF DESCRIPTION OF THE DRAWINGS

The present disclosure can be more fully understood by reading the following detailed description of the embodiment, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other element, or intervening elements may also be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
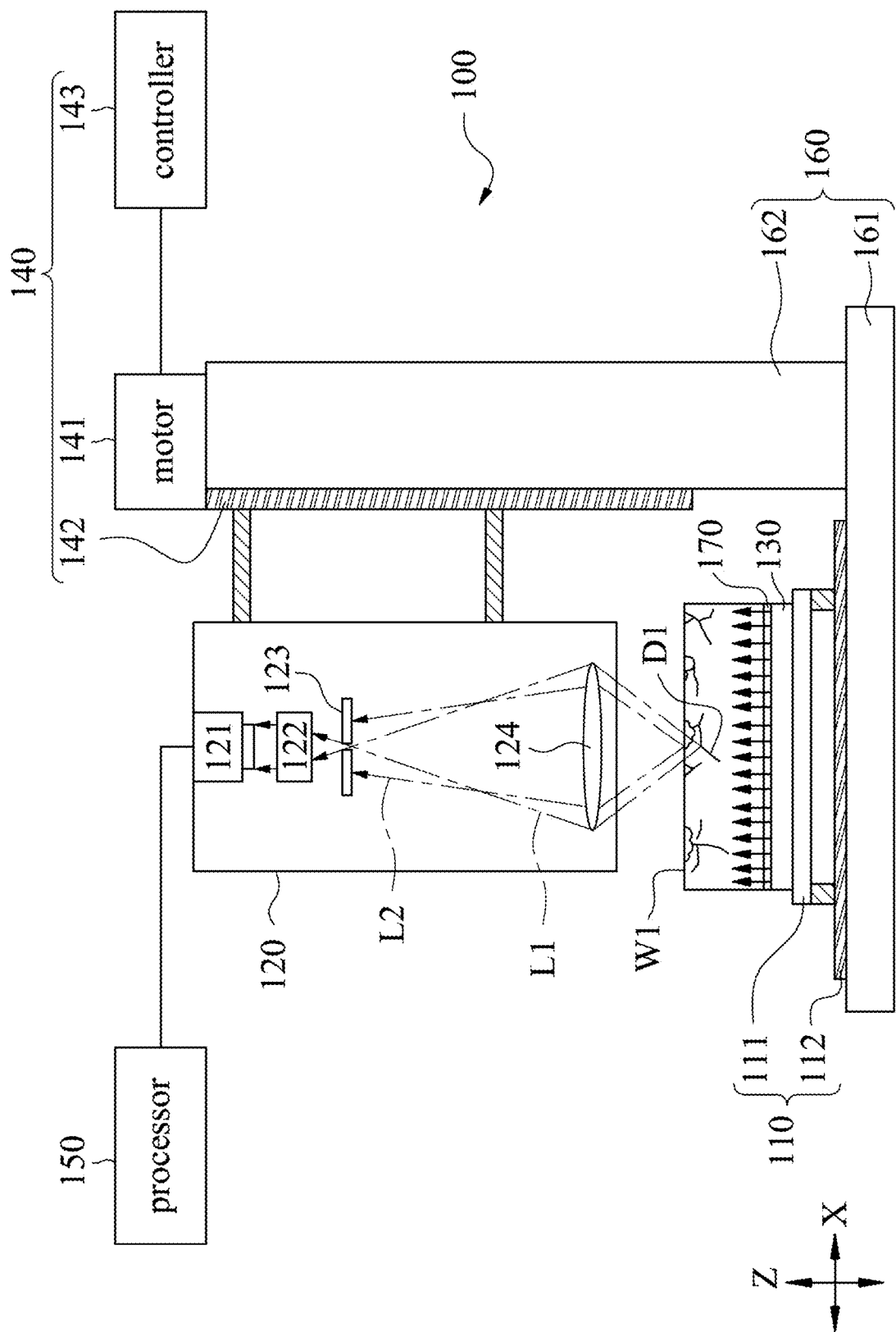
FIG. 1 shows a schematic view of a wafer defect analyzing device according to one embodiment of the present disclosure.

FIG. 1 shows a schematic view of a wafer defect analyzing device 100 according to one embodiment of the present disclosure. The wafer defect analyzing device 100 includes a light source 130, an imaging mechanism 120, a height adjusting mechanism 140 and a processor 150. The light source 130 is configured to carry a wafer W1 and to emit an infrared light. The imaging mechanism 120 includes a camera 121 facing toward the light source 130 for shooting the wafer W1, a microscopic objective lens 124 located between the camera 121 and the light source 130, a light filtering element 123 located between the camera 121 and the microscopic objective lens 124, and a gain element 122 located between the camera 121 and the light filtering element 123. The height adjusting mechanism 140 is connected to the imaging mechanism 120 and includes a motor 141. The processor 150 is signally connected to the imaging mechanism 120. The height adjusting mechanism 140 moves the imaging mechanism 120 along a longitudinal axis Z, the imaging mechanism 120 shoots a plurality of images of the wafer W1, and the processor 150 receives and analyzes the images to analyze a defect D1 on the wafer W1.

Therefore, because the infrared light may pass through the wafer W1, especially the wafer W1 made of silicon, the imaging mechanism 120 may shoot real images of the wafer W1, and the defect D1 may be clearly identified. Moreover, with that the height adjusting mechanism 140 drives the imaging mechanism 120 to move along the longitudinal axis Z, the focal position of the imaging mechanism 120 may be moved, and different images corresponding to different positions of the wafer W1 along the longitudinal axis Z may be obtained, thereby favorable for analyzing features of the defect D1, such as a depth H1 (labeled in FIG. 2) of the defect D1. Details of the wafer defect analyzing device 100 may be described hereinafter.

The wafer defect analyzing device 100 may further include a machine body 160 and a horizontal moving mechanism 110. The machine body 160 includes a working table 161 and a standing frame 162. The standing frame 162 is connected to the working table 161 perpendicularly. The horizontal moving mechanism 110 includes a carrier 111 and a horizontal rail 112. The horizontal rail 112 is mounted at the working table 161. The carrier 111 is disposed at the horizontal rail 112 so as to move the wafer W1 disposed thereon along a horizontal axis X, and the carrier 111 may be made of a transparent material. In other embodiments, the carrier may be omitted, and the light source may be directly disposed at the horizontal rail, but the present disclosure is not limited thereto. The horizontal rail 112 may be a linear rail with balls, and a slider of the horizontal rail 112 may be driven to move the carrier 111 relative to the working table 161. In one embodiment, the wafer defect analyzing device may include two horizontal moving mechanisms to respectively move the wafer along two axes, e.g., a length axis and a width axis parallel thereto, relative to the working table. In another embodiment, one horizontal moving mechanism may move the carrier in one horizontal axis, and another horizontal moving mechanism may move the imaging mechanism along another horizontal axis, but the present disclosure is not limited thereto.

The height adjusting mechanism 140 may include a motor 141, a longitudinal rail 142 and a controller 143. The longitudinal rail 142 is disposed at the standing frame 162, and the motor 141 is also disposed at the standing frame 162. The longitudinal rail 142 may be a linear rail with balls. The controller 143 may control the motor 141 to move a slider of the longitudinal rail 142 so as to move the imaging mechanism 120 connected to the slider along the longitudinal axis Z. In the embodiment shown in FIG. 1, the motor 141 may have a high precision stepper motor structure, thereby accurately controlling the imaging mechanism 120 to slightly move along the longitudinal axis Z. The accuracy of the motor 141 may be 0.1 μm, which can further prevent vibration caused by movement of the imaging mechanism 120 from affecting focusing. The controller 143 may further be signally connected to the processor 150 to receive commands from the processor 150.

The imaging mechanism 120 is connected to the slider of the longitudinal rail 142. In the imaging mechanism 120, the camera 121, the gain element 122, the light filtering element 123, and the microscopic objective lens 124 are disposed from an upper end to a lower end along the longitudinal axis Z arranged in order. Consequently, the microscopic objective lens 124 is near the wafer W1, and the camera 121 is far away from the wafer W1. The camera 121 may be an IR camera based CCD or CMOS to obtain images with high qualities. The gain element 122 may be light gain elements such as photodiode array, the light filtering element 123 may have a pinhole grating sheet structure, but the present disclosure is not limited thereto. The light filtering element 123 may be used to filter light beams from a nonfocal plane, e.g., light beams L2, and light beams from a local plane, e.g., light beams L1, may pass therethrough to enter the camera 121, thereby preventing unclear defect D1 caused by interference generated in the image containing overlap data of the light from both the nonfocal plane and the focal plane. After filtering the light from nonfocal plane, the light strength is decreased, and thus the light may be enhanced by using the gain element 122. Therefore, a dark image may be prevented.

The imaging mechanism 120 by be assembled in advance to form a module, distances between the elements are fixed, and the focal point of the imaging mechanism 120 is fixed. Because the focal point of the imaging mechanism 120 is fixed, as the imaging mechanism 120 is moved along the longitudinal axis Z by the height adjusting mechanism 140, the focal point may also move along the longitudinal axis Z to form a plurality of focal positions.

The light source 130 may have a panel light source structure so as to emit uniform infrared light to pass through the wafer W1. In the embodiment shown in FIG. 1, a wave length of the infrared light is in a range from 1100 nm to 1500 nm, which may favorable for the infrared light to pass through the wafer W1 made of silicon. The wave length of the infrared light may be 1200 nm, and the infrared light having the wave length of 1200 nm has the highest penetration.

Figure 2:
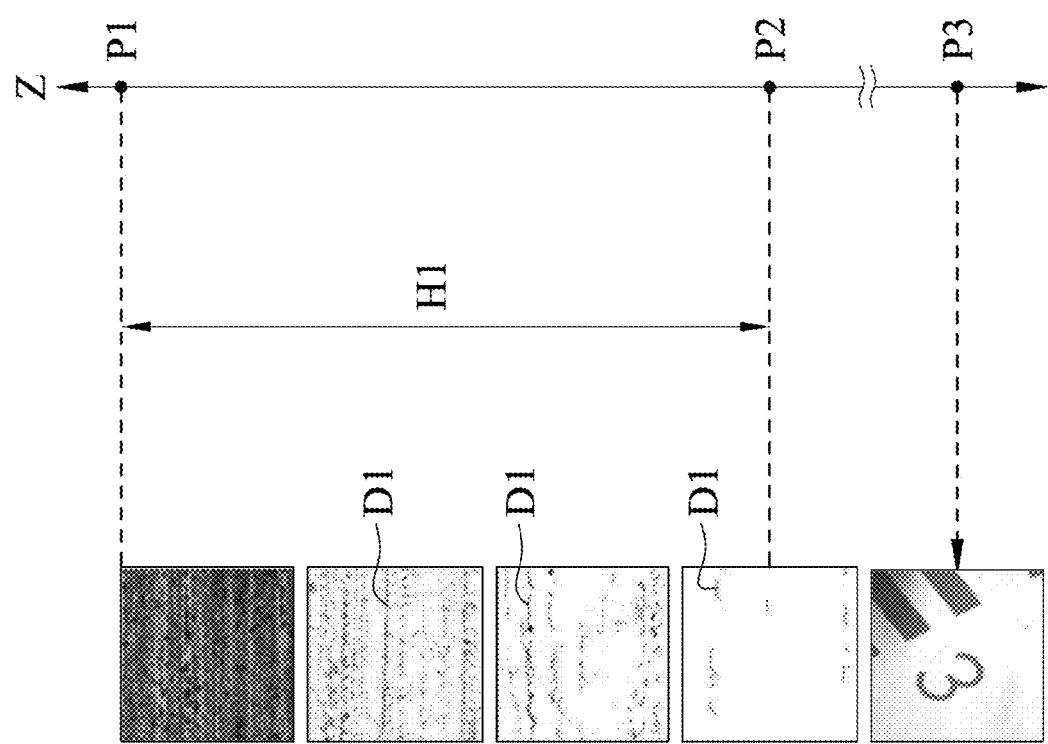
FIG. 2 shows different images corresponding to different focal positions obtained by the wafer defect analyzing device of FIG. 1.

FIG. 2 shows different images corresponding to different focal positions obtained by the wafer defect analyzing device 100 of FIG. 1. Please refer to FIG. 2 with reference of FIG. 1, the carrier 111 may be moved in advance to allow the imaging mechanism 120 to correspond to a shot area of the wafer W1. As shown in the uppermost position of FIG. 2, the imaging mechanism 120 is moved by the height adjusting mechanism 140 to find the focal position where the imaging mechanism 120 can clear focus on the top surface of the wafer W1, and the focal position may be served as a top surface position P1 of the wafer W1 and be recorded. It is noted that, as the imaging mechanism 120 properly focuses, the shot image is clear, and the defect D1 on the surface of the wafer W1 can be clear shown. Whether the imaging mechanism 120 properly focuses or not may be confirmed by analyzing of the images conducted by the processor 150. The processor 150 may be a CPU, a DSP, a microprocessor or a microcontroller, and the processor 150 may be programmable to conduct specific functions.

The height adjusting mechanism 140 may continuously move the image mechanism 120 downward along the longitudinal axis Z, that is, toward the wafer W1. As mentioned above, since the imaging mechanism 120 is a module and the focal point is fixed, the focal point may also move downward to generate different focal positions in the shot area along the longitudinal axis Z. Therefore, the imaging mechanism 120 may continuously shoot images of the wafer W1 at different focal positions. In the embodiment shown in FIG. 1, the imaging mechanism 120 may automatically shoot as the height adjusting mechanism 140 moving a predestined distance, and the relation between the focal positions and the images may be recorded.

The defect D1 may extend both in the horizontal axis X and the longitudinal axis Z, and if the defect D1 cannot be seen or almost cannot be seen in the image corresponding to a specific focal position, e.g., the focal position P2, it means that the defect D1 stops extending downward.

Generally, as shown in FIG. 2, the image includes a plurality of defects D1, the depth H1 of each defect D1 may not be the same. Some defects D1 are deeper, and some defects D1 are shorter. Hence, as the focal point moving downward, only deeper defects D1 may be shot, and a number of the defects D1 in the image decreases. The processor 150 can calculate a gray value average of the image. Because the defect D1 has a dark color, as the image has many defects D1, the image is darker and the gray value average is small. For example, the gray value average of the image of the top surface position P1 may be 64. On the contrary, as the image has a few defects D1, the image is brighter and the gray value average is large. For example, the gray value average of the image of the focal position P2 may be 240. Hence, in the embodiment, a threshold is in a range of 220 to 255, e.g., 240, may be predetermined to confirm the status of the defects D1. As a quantity of the defects D1 decreases and the gray value average is larger than or equal to the threshold, there may be no defect D1 at the corresponding focal position, i.e., the focal position P2, or thereby may be a few defect D1 but the reliability and the capacity will not be affect. The corresponding focal position may then be recorded. Since the imaging mechanism 120 is moved by the height adjusting mechanism 140, and the moving distance is known by the processor 150; as a result, a distance value of the corresponding focal distance, i.e., the focal position P2, corresponding to the longitudinal axis Z may be obtained, and a distance value of the surface position P1 may also be obtained. The difference therebetween may be calculated, and the depth H1 of the deepest defect D1 in the shot area relative to the longitudinal axis Z may be obtained. A plurality of shot areas may be predetermined, and the largest depth H1 in all of the shot areas may be defined as the depth H1 of the defect D1. The depth H1 may be used to judge whether the wafer W1 needs to be grinded or not, and may be used to define a depth of grinding.

The wafer defect analyzing device 100 may further include a pattern layer 170 locate between the light source 130 and the wafer W1. As shown in FIG. 2, the height adjusting mechanism 140 may move the imaging mechanism 120 to find the focal position which can clearly focus on the pattern layer 170, and the processor 150 may define the found focal position to be a bottom surface position P3 of the wafer W1. In one situation, the bottom surface position P3 may be found first, and then move the imaging mechanism 120 to the top surface position P1. The deference between the bottom surface position P3 and the top surface position P1 may be obtained and whether the deference is equal to a thickness of the wafer W1 is judged, thereby judging whether the wafer defect analyzing device 100 is normal, but the present disclosure is not limited thereto.

Figure 3:
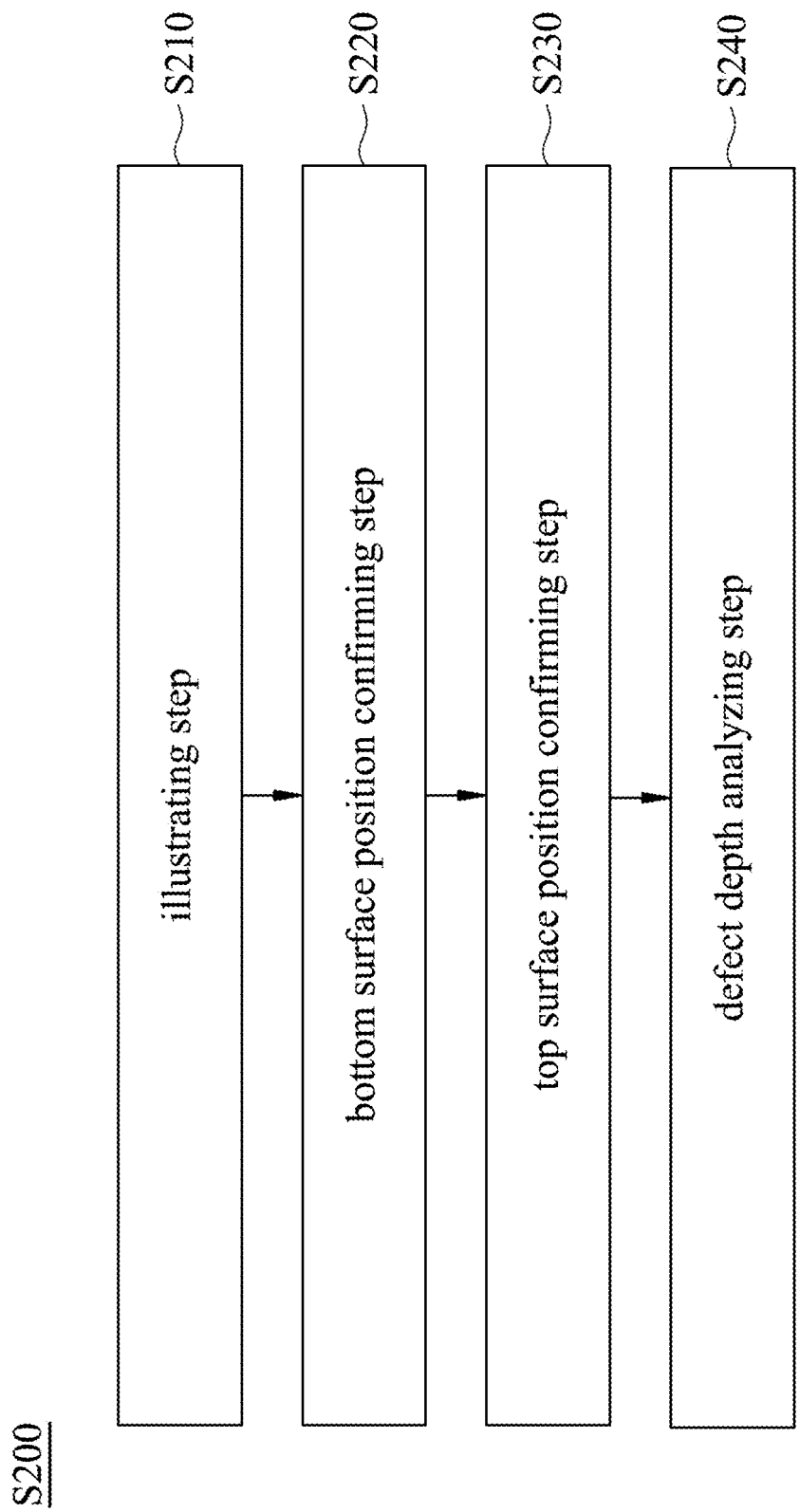
FIG. 3 shows a block flow chart of a wafer defect analyzing method according to another embodiment of the present disclosure.

FIG. 3 shows a block flow chart of a wafer defect analyzing method S200 according to another embodiment of the present disclosure. The wafer defect analyzing method S200 includes an illustrating step S210 and a defect depth analyzing step S240. Details of the wafer defect analyzing method S200 will be described hereinafter with the references of the wafer defect analyzing device 100 of FIGS. 1 and 2.

In the illustrating step S210, the wafer W1 is placed above the light source 130, and the light source 130 emits the infrared light penetrating the wafer W1.

In the defect depth analyzing step S240, the motor 141 of the height adjusting mechanism 140 drives the imaging mechanism 120 to move toward the wafer W1 along the longitudinal axis Z to allow the imaging mechanism 120 to shoot the images respectively corresponding to the focal positions in the shot area of the wafer W1, the imaging mechanism 120 includes the camera 121, the gain element 122, the light filtering element 123 and the microscopic objective lens 124 arranged in order along the longitudinal axis Z, and the processor 150 confirms the depth H1 of the defect D1 in the shot area according to the images and the focal positions.

Precisely, the wafer defect analyzing method S200 may further include a top surface position confirming step S230, the motor 141 drives the imaging mechanism 120 to shoot the top surface of the wafer W1, thereby finding one of the focal positions that correspond to the top surface to conform the top surface position P1 of the top surface. After which, in the depth analyzing step S240, the top surface position P1 may be served as the calculating reference point. The imaging mechanism 120 may automatically shoot as the height adjusting mechanism 140 moving a predestined distance, and the relation between the focal positions and the images may be recorded. As the gray value average of the defects D1 in one of the images is larger than or equal to the threshold, the focal position, i.e., the focal position P2, corresponding to the one of the images and the difference between the focal position P2 and the top surface position P1 may be obtained by the processor 150. As a result, the difference may be served as the depth H1 of the defect D1.

As mentioned above, the imaging mechanism 120 may be moved by the height adjusting mechanism 140 along the longitudinal axis Z, and the focal point is continuously changed to form different focal positions in the wafer W1. In other words, the imaging mechanism 120 may be moved along the longitudinal axis Z to focus on different focal positions so as to capture clear images at the focal positions. Hence, the processor 150 may clearly identify the defects D1 of the clear images, whether the defects D1 are included in the images may be confirmed, and the gray value average of the image may be obtained. The moving distance of the height adjusting mechanism 140, i.e., the difference between the focal position, e.g., the focal position P2, and the top surface position P1 along the longitudinal axis Z may be calculated to obtain the depth H1 of the defects D1.

The wafer defect analyzing method S200 may further include a bottom surface position confirming step S220, the pattern layer 170 is placed between a bottom surface of the wafer W1 and the light source 130, the motor 141 drives the imaging mechanism 120 to shoot the pattern layer 170 to find the focal position corresponding to the pattern layer 170, thereby confirming the bottom surface position P3. Hence, as mentioned above, the thickness of the wafer W1 may be calculated via calculating the difference between the bottom surface position P3 and the top surface position P1 along the longitudinal axis Z. The thickness may then be compared with the known thickness of wafer W1, and whether all the elements work normally may be judged.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A wafer defect analyzing device, comprising:
  a light source configured to carry a wafer and to emit an infrared light;
  an imaging mechanism, comprising:

a camera facing toward the light source for shooting the wafer;

a microscopic objective lens located between the camera and the light source;

a light filtering element located between the camera and the microscopic objective lens; and a gain element located between the camera and the light filtering element;

a height adjusting mechanism connected to the imaging mechanism and comprising a motor; and a processor signally connected to the imaging mechanism;

wherein the height adjusting mechanism moves the imaging mechanism along a longitudinal axis, the imaging mechanism shoots a plurality of images of the wafer, and the processor receives and analyzes the images to analyze a defect on the wafer.

2. The wafer defect analyzing device of claim 1, wherein a wave length of the infrared light is in a range from 1100 nm to 1500 nm.

3. The wafer defect analyzing device of claim 1, wherein the motor has a high precision stepper motor structure.

4. The wafer defect analyzing device of claim 1, further comprising a pattern layer locate between the light source and the wafer.

5. The wafer defect analyzing device of claim 1, wherein the light filtering element has a pinhole grating sheet structure.

6. The wafer defect analyzing device of claim 1, wherein a focal point of the imaging mechanism is fixed.

7. A wafer defect analyzing method, comprising:

an illustrating step, wherein a wafer is placed above a light source, and the light source emits an infrared light penetrating the wafer; and a defect depth analyzing step, wherein a motor of a height adjusting mechanism drives an imaging mechanism to move toward the wafer along a longitudinal axis to allow the imaging mechanism to shoot a plurality of images respectively corresponding to a plurality of focal positions in a shot area of the wafer, the imaging mechanism comprises a camera, a gain element, a light filtering element and a microscopic objective lens arranged in order along the longitudinal axis, and a processor confirms a depth of a defect in the shot area according to the images and the focal positions.

8. The wafer defect analyzing method of claim 7, further comprising a top surface position confirming step, wherein the motor drives the imaging mechanism to shoot a top surface of the wafer, thereby finding one of the focal positions that correspond to the top surface to conform a top surface position of the top surface.

9. The wafer defect analyzing method of claim 8, wherein in the defect depth analyzing step, the top surface position is served as a calculating reference point, as a gray value average of one of the images is larger than or equal to a threshold, a difference between the focal position of the one of the images and the top surface position is obtained by the processor to be served as the depth of the defect.

10. The wafer defect analyzing method of claim 9, wherein the threshold is in a range of 220 to 255.

11. The wafer defect analyzing method of claim 9, wherein in the defect depth analyzing step, the imaging mechanism automatically shoots as the height adjusting mechanism moving a predestined distance.

12. The wafer defect analyzing method of claim 8, further comprising a bottom surface position confirming step, wherein a pattern layer is placed between a bottom surface of the wafer and the light source, the motor drives the imaging mechanism to shoot the pattern layer to find the focal position corresponding to the pattern layer, thereby confirming a bottom surface position.

13. The wafer defect analyzing method of claim 12, wherein a thickness of the wafer is calculated via calculating a difference between the bottom surface position and the top surface position along the longitudinal axis.

14. The wafer defect analyzing method of claim 7, wherein the motor has a high precision stepper motor structure.

15. The wafer defect analyzing method of claim 7, wherein a wave length of the infrared light is in a range from 1100 nm to 1500 nm.

* * * * *